(12) United States Patent
Garcia Morchon et al.

(10) Patent No.: US 11,212,098 B2
(45) Date of Patent: Dec. 28, 2021

(54) DEVICE AND METHOD SHARING A MATRIX FOR USE IN A CRYPTOGRAPHIC PROTOCOL

(71) Applicant: KONINKLIJKE PHILIPS N.V., Eindhoven (NL)

(72) Inventors: Oscar Garcia Morchon, Eindhoven (NL); Ludovicus Marinus Gerardus Maria Tolhuizen, Waalre (NL); Ronald Rietman, Eindhoven (NL); Sauvik Bhattacharya, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 209 days.

(21) Appl. No.: 16/490,931

(22) PCT Filed: Feb. 27, 2018

(86) PCT No.: PCT/EP2018/054731
§ 371 (c)(1),
(2) Date: Sep. 4, 2019

(87) PCT Pub. No.: WO2018/162272
PCT Pub. Date: Sep. 13, 2018

(65) Prior Publication Data
US 2019/0386828 A1   Dec. 19, 2019

(30) Foreign Application Priority Data

Mar. 6, 2017   (EP) .................................... 17159296

(51) Int. Cl.
*H04L 9/30*     (2006.01)
*H04L 9/08*     (2006.01)
(Continued)

(52) U.S. Cl.
CPC ............ *H04L 9/3093* (2013.01); *G06F 7/582* (2013.01); *G06F 17/16* (2013.01); *H04L 9/0662* (2013.01);
(Continued)

(58) Field of Classification Search
CPC ... H04L 9/3093; H04L 9/0662; H04L 9/0822; H04L 9/0841; H04W 12/0471; G06F 7/582; G06F 17/16
See application file for complete search history.

(56) References Cited

U.S. PATENT DOCUMENTS

2001/0036275 A1*  11/2001  Murakami ............ H04L 9/0847
                                                                380/277
2004/0062390 A1*   4/2004  Slavin .................... H04L 9/302
                                                                 380/30

(Continued)

OTHER PUBLICATIONS

Billet et al., "Efficient Traitor Tracing from Collusion Secure Codes,", pp. 171-182, 2008. (Year: 2008).*

(Continued)

*Primary Examiner* — Yonas A Bayou (57) ABSTRACT

A network node (110) is provided configured for a cryptographic protocol based on a shared matrix. The network node is arranged to construct the shared matrix (A) in accordance with the selection data and a shared sequence of values. Multiple entries of the shared matrix are assigned to multiple values of the sequence of data as assigned by the selection data. The shared matrix is applied in the cryptographic protocol.

18 Claims, 6 Drawing Sheets

(51) Int. Cl.
*H04L 9/06* (2006.01)
*G06F 17/16* (2006.01)
*G06F 7/58* (2006.01)
*H04W 12/04* (2021.01)
*H04W 12/0471* (2021.01)

(52) U.S. Cl.
CPC .......... *H04L 9/0822* (2013.01); *H04L 9/0841* (2013.01); *H04W 12/0471* (2021.01)

(56) References Cited

U.S. PATENT DOCUMENTS

| | | | | |
|---|---|---|---|---|
| 2004/0225899 A1* | 11/2004 | Mizrah | ................... | G06F 21/31 726/7 |
| 2004/0258240 A1* | 12/2004 | Singh | ................... | H04L 9/3066 380/30 |
| 2008/0069346 A1* | 3/2008 | Rubin | ................... | H04L 9/0841 380/44 |
| 2008/0148352 A1* | 6/2008 | Matsumoto | ............. | G06F 21/34 726/2 |
| 2009/0154711 A1* | 6/2009 | Jho | ......................... | H04L 9/083 380/286 |
| 2012/0166809 A1* | 6/2012 | Barton | ................... | H04L 9/0844 713/181 |
| 2013/0139224 A1* | 5/2013 | Wehmeier | ............. | G06F 21/552 726/4 |
| 2015/0067336 A1* | 3/2015 | Ding | ......................... | H04L 9/14 713/171 |
| 2015/0124970 A1* | 5/2015 | Li | ......................... | H04L 9/3033 380/283 |
| 2015/0341327 A1* | 11/2015 | Barton | ................. | H04L 9/3226 713/168 |
| 2017/0063541 A1* | 3/2017 | Cheng | ....................... | H04L 9/12 |

OTHER PUBLICATIONS

Billet et al: "Efficient Traitor Tracing From Collusion Secure Codes"; ICITS 2008, LNCS 5155, pp. 171-182. 2008.

Cheon et al: "Lizard: Cut Off the Tail! Practical Post-Quantum Public-Key Encryption From LWE and LWR"; International Conference on Security and Cryptography for Networks, SCN 2018, 20 Page Document.

PCT/EP2018/054731, ISR and Written Opinion, dated May 24, 2018, 15 Page Document.

Sendrier: "Code-Based One Way Functions"; Ecrypt Summer School Emerging Topics in Cryptographic Design and Cryptanalysis, May 3, 2007, 35 Page Document.

Alkim et al.:"Post-Quantum Key Exchange—A New Hope"; 25th USENIX Ssecurity Symposium, Aug. 10-12, 2016, pp. 327-343.

Bos et al.: "Frodo:Take Off the Ring! Practical, Quantum-Secure Key Exchange From LWE" CCS'16 Oct. 24-28, 16, Vienna, Austria, 2016, 13 Page Document.

* cited by examiner

DEVICE AND METHOD SHARING A MATRIX FOR USE IN A CRYPTOGRAPHIC PROTOCOL

CROSS-REFERENCE TO PRIOR APPLICATIONS

This application is the U.S. National Phase application under 35 U.S.C. § 371 of International Application No. PCT/EP2018/054731, filed on Feb. 27, 2018, which claims the benefit of European Patent Application No. 17159296.7, filed on Mar. 6, 2017. These applications are hereby incorporated by reference herein.

FIELD OF THE INVENTION

The invention relates to an electronic network node, an electronic method for an electronic network node configured for a cryptographic protocol based on a shared matrix, a computer readable medium

BACKGROUND

There exist a number of cryptographic protocols which are based on a matrix shared between the two nodes who execute the protocol. Although the shared matrix is typically public, both parties operate on the shared matrix with data which is private to the party that performs the computation, e.g., using secret information. Attacking such cryptographic protocols leads to lattice based problems, e.g., an attacker is required to solve a lattice problem, such as a shortest vector lattice problem, to attack the protocol. Lattice problems are expected to be quantum safe, and accordingly this is an active area of research.

A few of these protocols will be briefly discussed herein as a motivating example. However, in summary, the nodes typically combine the shared matrix with private information of their own. For example, a network node may compute a matrix product between the shared matrix and a private vector or matrix of the network node as part of the cryptographic protocol. For example, noise may be added to the result of the computation, e.g., in the form of a noise vector or matrix that is added to the multiplication result or in the form of rounding or scaling of the result. After adding the noise, the result still contains sufficient information on the private key in order to perform useful operations for another node, e.g., signing, encrypting, key agreement, etc., but not sufficient information to recover the private data of the other node. Key reconciliation may be used to correct for the added noise.

The starting point of such lattice based cryptography is that both parties, e.g., network nodes 110 and 111 have access to a shared matrix. This matrix is typically selected at random and is quite large. The shared matrix has multiple entries, and each entry has a value. For example, a shared matrix may have dimensions of, say, 500 times 500, or even larger. In exemplifying computations, we will use a square shared matrix with dimension $512=2^9$. Entries in the shared matrix are typically modulo a modulus q, which may be, say $2^{10}$. Thus, a shared matrix may represent about $2^9 \cdot 2^9 \cdot 2^{10} = 2^{28}$ bits of information.

Although the shared matrix is often public, and could be transmitted as plain data, clearly, such large amounts of information is problematic, especially given the fact that an important application of cryptographic protocols is expected to be the internet of things, in which resource-restricted nodes operate on data which are to be cryptographically protected. For example, the nodes may form a sensor network.

A first way to reduce overhead caused by the requirement that a large matrix is shared between two nodes is to re-use the same matrix many times over. Unfortunately, this leads to cryptographic problems. An attacker can perform extensive pre-computations on the shared matrix, if it knows that matrix will be used in a future cryptographic exchange. Examples of such precomputations attack are, e.g., the Logjam attack on finite-field Diffie-Hellman. On the other hand, if a fresh shared matrix is used for each execution of the cryptographic protocol, then the attacker would be presented with a fresh lattice problem for each execution; It is thus preferred not to re-use the same matrix.

A second way to reduce overhead caused by the large shared matrix is to send a random seed instead of the shared matrix. The random seed is then used to seed a deterministic random number generator, which in turn generates the shared matrix. Many deterministic random number generators are known. Unfortunately, in this way transmission overhead is traded for computational overhead. Resource-limited devices would need to compute a long time to generated the shared matrix. The problem may be just as bad for a large server that handles many simultaneous computations at the same time. Moreover, if an attacker could cause such a server to perform many random number generations, it would lead to denial-of-service attacks. The attacker could start many connections with the server and abandon them after the server is committed to generating the shared matrix from a random seed.

SUMMARY OF THE INVENTION

An electronic network node configured for a cryptographic protocol based on a shared matrix is provided that addresses these and other problems. The shared matrix has multiple entries and each entry has a value. For ease of reference the network node will be identified as the first network node, distinguishing it from a second network node with which is communicates. The adjective 'first' and 'second' have no further meaning.

The first network node comprises
- a communication interface arranged for digital communication with a second network node,
- a processor circuit configured to
    - obtain a sequence of values for the entries of the shared matrix, the sequence of values being shared with the second network node,
    - receive selection data from the second network node, or determining selection data and sending the selection data to the second network node, the selection data indicating multiple positions in the sequence of values and assigning to multiple entries of the shared matrix a value of the sequence of values indicated by the selection data,
    - construct the shared matrix in accordance with the selection data, setting said multiple entries of the shared matrix to the multiple values assigned by the selection data,
    - applying the shared matrix in the cryptographic protocol.

Selection data can be described with much fewer bits than the sequence of values can be. For example, in an embodiment, the bit size of the selection data is smaller than the values of the sequence of values which are indicated by the selection data and assigned to entries of the shared matrix, preferably less than half, preferably less than 1/10. For example, in some embodiments the amount of selection data needed to assign data to a group of entries in the shared matrix is less than 1/100 of the amount of data needed to describe the data itself. If selection data is generated from a random number generator then less data needs to be generated than generating the values in the shared matrix themselves would, regardless of whether this happens at the node that sends selection data or at the node that receives the selection data. Especially for a node, e.g., a server, with many connections to second nodes this makes a substantial difference in operating the network node. Compared to the needed bandwidth for sending the data itself, also a substantial reduction is obtained.

In an embodiment, a node caches the sequence of values and uses it for multiple connections. For example, in an embodiment, a node can send or receive a sequence identifier to identify the sequence of values to use. The identifier could, e.g., be a hash over the sequence of values, but in an advantageous embodiment the sequence identifier comprises a random seed from which the sequence of values may be generated. In this way, a receiver of a sequence identifier can either retrieve the sequence identifier from a cache memory or can generate the sequence of values.

The lattices that an attacker would obtain for different matrices that are shared in this way are different even if the underlying sequence of values is the same. Especially if the number of different lattices is larger, the advantage of the attacker is significantly reduced.

The network node is an electronic device. The network node may be a mobile electronic device, such as a mobile phone. The network node may be a set-top box, smart-card, computer, or the like.

A method of sharing a matrix described herein may be applied in a wide range of practical applications. Such practical applications include financial applications, e.g., to share credit card information, privacy enhancing applications, e.g., messaging applications, medial applications, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a cryptographic system, FIG. 2a, 2b, 2c schematically show examples of an embodiment of selection data, FIG. 3a schematically shows an example of an embodiment of a cryptographic system, FIG. 3b schematically shows an example of an embodiment of a detail of a cryptographic protocol, FIG. 4 schematically shows an example of an embodiment of a method for sharing a matrix, FIG. 5a schematically shows a computer readable medium having a writable part comprising a computer program according to an embodiment, FIG. 5b schematically shows a representation of a processor system according to an embodiment.

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

Figure 1:
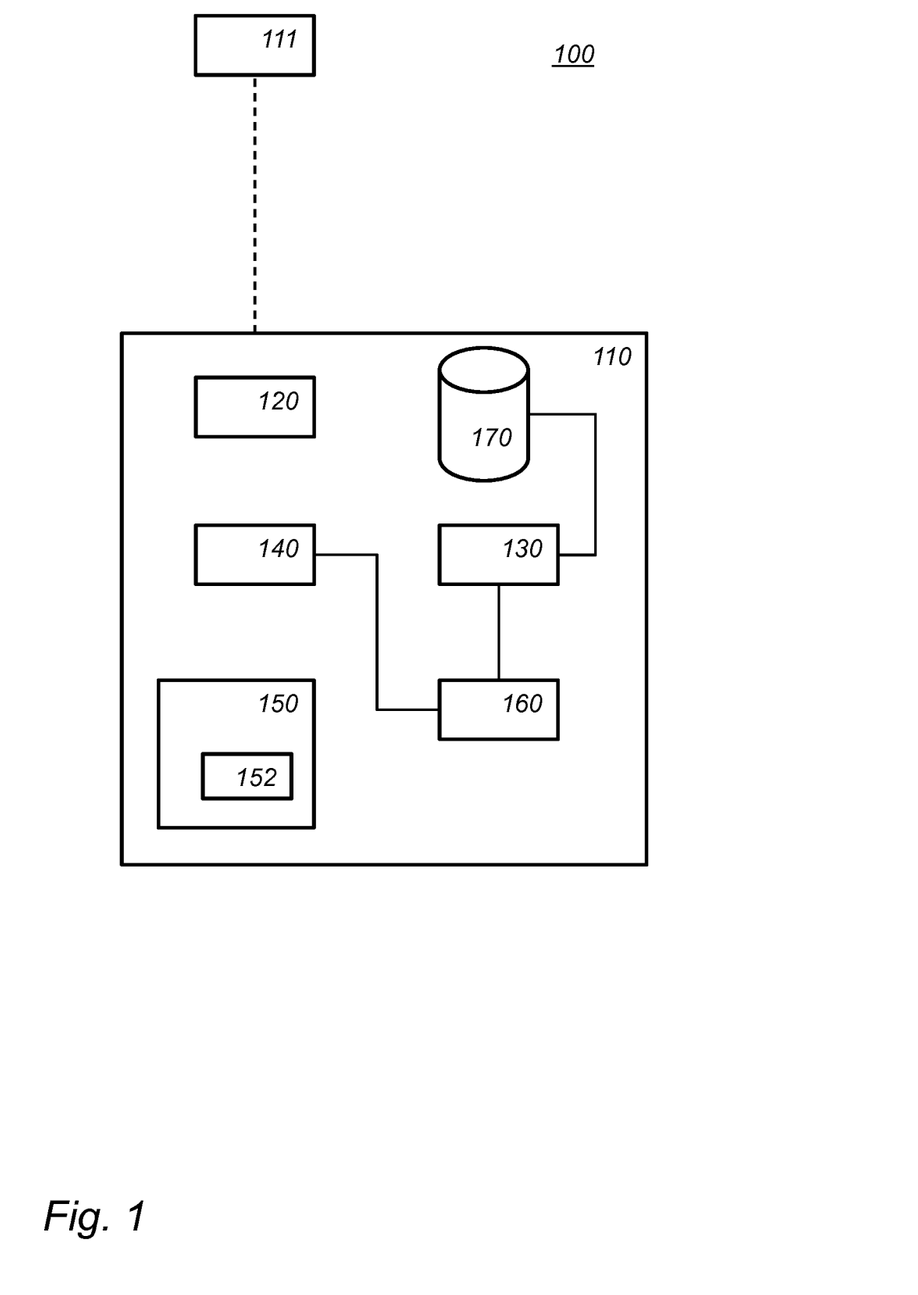

FIG. 1 schematically shows an example of an embodiment of a cryptographic system 100. Cryptographic system 100 comprises multiple network nodes. Shown in FIG. 1 are a first network node 110 and a second network node 111. For the most part, nodes 110 and 111 are of the same design, except where they have a sender-receiver relationship. The network nodes in system 100 are configured to execute a cryptographic protocol based on a shared matrix; in particular, first network node 110 and second network node 111 are configured for such a cryptographic protocol. Preferably a fresh shared matrix is used for each execution of the cryptographic protocol.

Network node 110 comprises a cryptographic unit 150. Cryptographic unit 150 is arranged to perform a cryptographic protocol using the shared matrix. As pointed out in the background, many such cryptographic protocols exist, and all require a large matrix which is shared between the two parties. Often a matrix product is computed between the shared matrix and a private vector or matrix of the network node as part of the cryptographic protocol. For example, cryptographic unit 150 may comprises a matrix multiplication unit 152 arranged to compute said matrix multiplication.

A first example, of a cryptographic protocol using a shared matrix is a key exchange protocol. For example, the first node may be configured to generate a private key matrix ($S_I$), generate a public key matrix ($P_I$), said generating comprising at least computing a matrix product between the shared matrix (A) and the private key matrix ($S_I$) obtaining a matrix product sending the public key matrix of the first network node to the second network node, receiving a public key matrix ($P_R$) of the second network node, computing a raw key as a matrix product between the received public key of the second node and the private key matrix of the first network node, wherein the first network node is further configured to compute a shared key from at least the raw key would.

By introducing noise during the generation of the public key matrix ($P_I$), it is avoided that an attacker could reconstruct the private keys from knowledge of the public keys and the shared key. This key agreement protocol is based on the fact that, except for the added noise, $S_R^T A S_I$ is the same for both the first and the second network node. Computing the matrix product between the shared matrix (A) and the private key matrix ($S_I$) is done modulo a modulus. One of the nodes can compute key reconciliation data and send it to the other node, to ensure both compute the same shared key form the matrix products. A more detailed description of a lattice based key agreement protocol is given in the article by J. Bos, C. Costello, L. Ducas, I. Mironov, M. Naehrig, V. Nikolaenko, A. Raghunathan, D. Stebila. "Frodo: Take off the ring! Practical, Quantum-Secure Key Exchange from LWE." (included herein by reference and referred to as 'Frodo').

A second example, of a lattice based cryptographic protocol is a public key encryption/decryption algorithm. For example, a network node may be configured to obtain a public key of a second network node, said public key comprising the selection data, and a further public key matrix (B), the further public key matrix having been previously obtained from the shared matrix and a private key matrix (S)

choose a random vector r, and compute two matrix products (e.g., $a'=A^T r$, $b'=B^T r$) between the random vector (r) and the shared matrix and between the random vector (r) and the further public key matrix, compute an encrypted message from a plain message by adding a blinding vector computed from a first one of the two matrix products, the encrypted message further including decryption information computed from the second one of the two matrix products.

Also in this example, noise may be added, e.g. in the form of scaling. A detailed example, of a lattice based public key encryption protocol may be found in the article by J. H. Cheon, D. Kim, J. Lee, Y. Song: "Lizard: Cut off the Tail! Practical Post-Quantum Public-Key Encryption from LWE and LWR" (induced herein by reference).

Returning to FIG. 1. There is thus the problem how to obtain a matrix shared between two nodes. The shared matrix has multiple entries each entry having a value. We will refer to the row and columns of the matrix. In an example, at least one of the number of rows and the number of columns is larger than 50, 100, 500, etc. The shared matrix may be square for convenience, although this is no necessity. The matrix may be a vector, e.g., when one of the dimensions is 1, however most advantages are obtained as both dimensions are large, e.g., when both the number of rows and the number of columns is larger than 50, 100, 500, etc.

The first and second network node each comprise a communication interface 120. Communication interface 120 of first network node 110 is arranged for digital communication with second network node 111. Typically, Communication interface 120 is arranged to communicate with many of the other nodes in system 100.

The communication interfaces may be arranged for digital communication with the other nodes in the key agreement system. It is not necessary though that all nodes in the system can be reached at all times. Communication interface 120 is arranged for digital communication. For example, the communication interfaces may be arranged to communicate over a computer network. For example, the communication interface may be arranged for wireless, e.g., Wi-Fi, ZigBee, Bluetooth and the like, and/or wired communication, e.g., Ethernet, USB, and the like. The communication between nodes 110 and 111 may also be a combination of wired and wireless connections. For example, the nodes in system 100, including nodes 110 and 111 may comprise an electronic storage that contains a communication identifier, which uniquely identifies the node within system 100. For example, the communication identifier may be included in digital messages exchanged between nodes 110 and 111, e.g., to address the message. For example, the communication identifier may an IP address, a MAC address, and the like.

The electronic network nodes are configured for a cryptographic protocol, such as the key exchange or public key encryption protocol examples given above. The cryptographic protocol involves exchanging messages between the nodes 110 and 111 over the communication interfaces 120, and performing computations on, e.g., data received from the other node. The execution of the protocols is implemented in a processor circuit, examples of which are shown below. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may also be wholly or partially be implemented in computer instructions that are stored at the network nodes and are executable by a microprocessor of the network node. In hybrid embodiments, functional units are implemented partially in hardware, e.g., as coprocessors, e.g., crypto coprocessors, and partially in software stored an executed on the network node.

Network node 110 comprises a base data manager 130 arranged to obtain a sequence of values for the entries of the shared matrix, the sequence of values being shared with the second network node. Network node 110 also comprises a base data memory 170 arranged for storing the shared sequence of values, e.g., after it has been obtained.

Like the entries in the shared matrix A, the values in the sequence of values may be selected modulo a modulus. The sequence of values is also referred to as the base data, or the base values etc. The sequence of values will be used to fill the shared matrix with. It was an insight of the inventors that a mapping from a sequence of values to the entries of a shared matrix can be transmitted in much fewer bits, or may be computed from much fewer pseudorandom outputs than the sequence of values itself. By varying the way in which the shared matrix is constructed from the sequence of values, a large number of different shared matrices can be obtained from the same base data. Thus, the cryptographic advantages of using a different shared matrix each time, is combined with the low overhead of re-using the same sequence of values.

There are a number of ways in which base data manager 130 may obtain base data which is shared with the second network node.

In a first example, base data memory 170 pre-stores the sequence of values. For example, the multiple network nodes in system 100 may be provided with the sequence at some point, e.g., during manufacture, at a trusted location, etc. The shared sequence of values may be a fixed sequence, for example, fixed in a standard, or the like. In this case, base manager 130 has little more to do than to provide access to base data memory 170 in which the sequence of values. Embodiments of this type, base data memory 170 or the part thereof in which the shared sequence of values is stored may be ROM memory.

In a second example, the sequence of values is obtained from a trusted third party. For example, periodically, base data manager 130 contacts a trusted third party, e.g., over a computer network, to obtain a new sequence of values. For example, base data manager 130 may be configured to obtain such a new sequence periodically, e.g., once every 30 days, e.g., at the beginning of each new month, etc.

To reduce transmission overhead, base data manager 130 may obtain the shared sequence of values as a random seed. For example, first network node 110 may comprise a deterministic pseudorandom number generator 160. Pseudorandom number generator may be seeded with the random seed and used to compute the sequence of values. The seed may be obtained from various sources, e.g., preprogrammed, e.g., during manufacture, e.g., received from the second network node, e.g., received from a trusted third party, etc. The selection data may also be generated at the first network node and sent to the second network node.

The sequence of values is used for multiple executions of the cryptographic protocol, for example, the sequence of values is used at least twice to construct at least two different shared matrices, shared with the second network node. In an embodiment, the sequence of values is shared with multiple network nodes, e.g., each of the multiple network nodes of system 100. The latter is not necessary though, for example, a particular sequence of values may be used just by the first and second network node; for example, the first time the first and second network node interact they may exchange a random seed to generate the sequence of values that is used between them thereafter. Below further embodiments using caching of sequences are described.

Pseudorandom number generator 160 may be a fast linear feedback generator such as the Mersenne twister. A cryptographically secure random number generator is however preferred. For example, pseudorandom number generator 160 may satisfy the so-called next-bit test. That is, given the first k bits of a random sequence, there is no polynomial-time algorithm that can predict the (k+1)th bit with probability of success non-negligibly better than 50%. There are many cryptographically secure random number generators known, e.g., a block cipher run in counter mode, e.g., the Advanced Encryption Standard in counter mode. A secure random number generator may also be obtained by running a hash function in counter mode, e.g., SHA-256, etc. The Mersenne twister may also be secured, e.g., by basing a pair of cryptographic stream ciphers on output from the Mersenne Twister. Further examples include the Blum-blum-shub generator, Blum-Micali generator, etc.

Network node 110 comprises a matrix generation unit 140. Matrix generation unit 140 is arranged to construct the shared matrix (A) in accordance with the selection data, setting said multiple entries of the shared matrix to the multiple values assigned by the selection data. The selection data thus describes a mapping between the shared sequence of values and the entries in the shared matrix. The selection data may be obtained from the second network node e.g., through communication interface 120. The sequence of values is transformed to an actual shared matrix A by the selection data.

Generation unit 140 may also determine selection data itself and send the selection data to the second network node. For example, if the selection data comprises tuples, permutations, rotation parameters, and the like as illustrated in the various embodiments, then generation unit 140 could select these at random as generated selection data. The generated selection data may be sent to the second network node. If the selection data is derived from the output of a deterministic random number generator, then the seed of the generator could be sent to the second network node instead.

Selection data thus indicates multiple values in the sequence of values and assigns to multiple entries of the shared matrix a value of the sequence of values indicated by the selection data. In an embodiment, all entries of the shared matrix receive their value from the sequence of values, however, it is not necessary that each entry receives that value from a location in the sequence of values that is indicated by the selection data; some entries in the shared matrix may receive their value from a fixed location in the sequence of values. A number of examples, are explained with reference to FIGS. 2a, 2b and 2c.

Figure 2A:
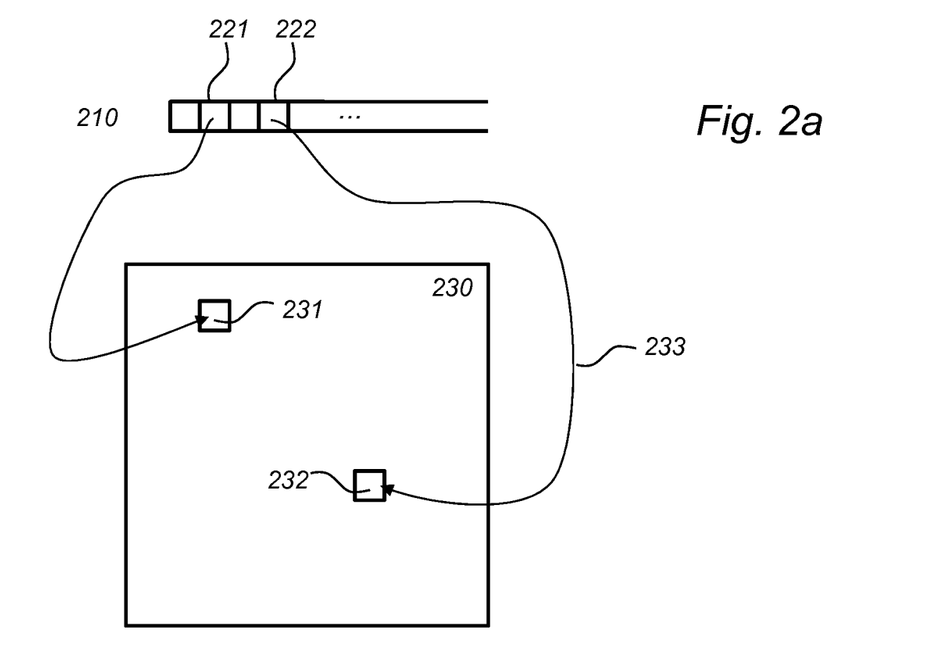

FIG. 2a schematically shows an example of an embodiment of selection data. The selection data identifies locations in the sequence of values 210, shown are values 221 and 222, that are to be assign to locations in the shared matrix 230, shown are entries 231 and 232.

For example, selection data may comprise a sequence of tuples, each tuple comprising an index in the sequence of values and an index in the shared matrix. For example, the sequence of values may be indexed linearly, e.g., counted sequentially, e.g., using the natural numbers. For example, the shared matrix may also be indexed with a single number, e.g., numbered sequentially, but may also be indexed by an x and y coordinate, e.g., indicating a column and row respectively. The selection data may for example comprise $\{(4, (2,5)), (7, (3,3)), \ldots\}$ to indicate that the value at index 4 in the sequence of values is to be placed at position (2,5) of the shared matrix, etc. The selection data does not comprise the actual values of entries in the shared matrix, instead the actual values of the shared matrix are selected from the sequence of values. In an embodiment, the selection data may be supplemented with amendment data. For example, the amendment data may comprise data that indicates how values in the shared matrix are to be changed, e.g., by comprising an increment or decrement, or comprising a new value. Such amendment data may be applied by generation unit 140 as well. Amendment data is considered less advantageous: sending new values requires many bits, and each item in the amendment data influences only a single element of the shared matrix, yet selection data may be specified with only few bits, but may influence a large number of entries of the shared matrix. Small increments/decrements could be specified with fewer bits but they have comparatively little influence on the resulting lattice, and in fact may disappear in the noise added after a matrix multiplication with the shared matrix.

It may happen that some position (i,j) of the shared matrix does not appear in the selection data. This may be resolved by giving the position a default value, e.g., a predetermined value. This may also be resolved by giving the position a value, from a default location in the sequence of values.

For example, the selection data may comprise a permutation. The assignment may then work by permuting the sequence of values according to the permutation and assigning the permuted sequence of values to entries of the shared matrix according to a default assignment. For example, if the permutation is denoted as a bijective function σ, that maps from the locations 1 to mn in the sequence of values to entries in the m×n matrix A, for some default way of numbering the entries in the shared matrix A, e.g. row-wise or column wise, etc. The selection data may comprise a representation of the permutation σ, and the assignment may work by assigning to index i according to the default way of indexing A the value of sequence 210 at location σ(i). The permutation may also be used the other way around, for example, the value at index i in the sequence may be assigned to entry σ(i) in the matrix.

Part of matrix A may correspond with fixed elements of the sequence, so that it is not necessary to fully specify the mapping between sequence 210 and matrix 230, either in tuples or in a permutation. It suffices that there are a sufficient number of different matrices that can be obtained using the selection data.

Figure 2B:
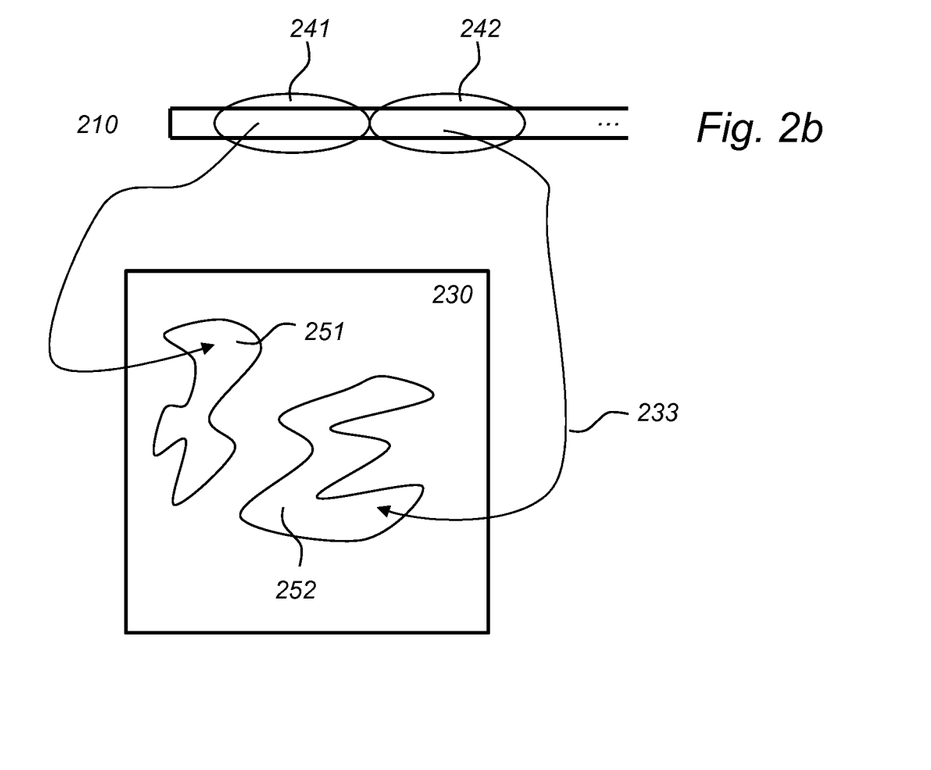

FIG. 2b schematically shows a first example of an embodiment of selection data. There are various ways to reduce the number of bits needed to specify a mapping between sequence 210 and matrix 230, one of which is illustrated with respect to FIG. 2b. In sequence of values 210 one or more first groups are defined, shown are first groups 241 and 242. In matrix 230 one or more second groups are defined, shown are second groups 251 and 252. To each first group in sequence 210 there corresponds a second group in matrix 230. The mapping between the entries of sequence 210 and the entries of matrix 230 can be restricted to mappings that map elements of a first group to elements of the corresponding second group. The first and second groups can be chosen at random. In FIG. 2b, the first groups are selected sequentially, but the second groups are selected at random. Other choices are possible. For example, also the second groups may be sequential, e.g., rows or columns, etc.

The mappings that can be indicated by the selection data can be further restricted by restricting the number of allowed mappings. For example, in an example, the mapping is a cyclic permutation.

Figure 2C:
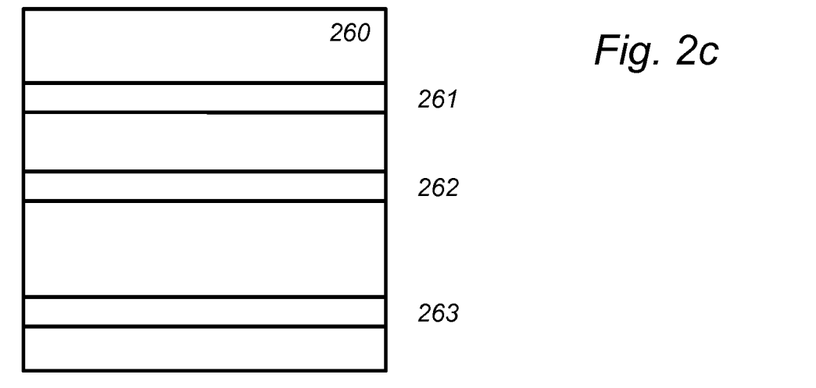

FIG. 2c schematically shows a first example of an embodiment of selection data. In this example, the base data forms a base matrix 260, e.g., the number of elements of the sequence of values is the same as the number of entries in the shared matrix, and may be indexed similarly. In this case the selection data may indicate a shared matrix by defining a permutation on the base matrix. For example, the selection data may indicate a cyclic permutation of a row and/or column of the base matrix by indicting a number of entries over which said row and/or columns is rotated. For example, the selection data may comprise a sequence of numbers, each a number of the sequence indicating a rotation over so many places of a row of the base matrix corresponding to the number.

In an embodiment, the selection data is information that allows the receiving party to find the changed matrix; e.g., a sequence of numbers, the i-th number of which indicating over how many positions the i-th row matrix of A is rotated; or a sequence of (row index, rotation order) pairs. Using fewer numbers is possible.

Note that the amount of data to specify a shared matrix from the base data in the sequence, e.g., in a base matrix can be much smaller than the amount of data in the shared matrix itself. For example, consider FIG. 2c, for a square matrix of dimension 512 and modulo 2048. Only 9 bits are needed to specify a cyclic permutation on a row, whereas 512*12 bits are needed to specify the data in the row itself. Thus, in this example, the part of the selection data that indicates which values in a row of the base matrix go to which location in the shared matrix is 9 bits, which is $9/(512*12)<1/100$ the size of the data in the row.

Each of the methods above is capable to generate a large amount of different shared matrices from a single sequence of values. For example, using the system to rotate rows of a base matrix needs only a rotation parameter for 8 rows, to produce $(2^9)^8$ different shared matrices for a random sequence of values 210. Said number $(2^9)^8$ is larger than $2^{64}$, which one may take as a security parameter. For this example, it is sufficient to send eight pairs of (row index, cyclic permutation order), resulting in just 8*(9+9) bits. If the rows that are to be rotated are predetermined, the needed amount of data is still further reduced to 8*9 bits. However, larger numbers of different matrices A are easily possible using a more parameters in the selection data, e.g., larger than $2^{128}$, larger than $2^{256}$, etc., using 15 and 29 rotation parameters for 15 and 29 rows or columns respectively. In an embodiment, part of the rotation parameters rotate rows while part of the rotation parameters rotate columns. This has the advantage that the rotation is equally incompatible with matrix multiplications for both nodes, e.g., in situation in which one of the nodes uses a left multiplication and the other a right multiplication. In yet another embodiment, with square matrices, rotations take place over (cyclic) diagonals of the matrix.

Some values in the shared matrix may have default values of the sequence. For example, some rows may always be equal to some predetermined values of the sequence.

The selection data may be communicated in at least two different ways. In a first option, the selection data directly represents which entry of the sequence maps to which entry of the shared matrix. This may be a very efficient way to construct the matrix A. For example, to compute from a parameter in the selection data at least one entry in the sequence of values and at least one entry in the shared matrix may be linear in the parameter. That is the exponent of p occurring in the mapping from the sequence of values to the shared matrix is at most 1. Using the representations of FIGS. 2b and 2c computing a new location for a row modulo the number of entries in a row of the base matrix, or computing the index in a random first or second group is a single computation.

For example, let a first group in the sequence of values be the entries numbered x ... x+m−1, we will assume a row of the shared matrix has m elements. Let p be the parameter in the selection data that indicates the number of entries in this group are rotated. Let the second group be the k'th row of the matrix. The entries in A are numbered row wise starting from zero. The rows are also counted starting from zero. In this case, an entry x+i in the sequence may be mapped to an entry km+((i+p)mod m). The above computation is linear in p. We may generalize this mapping such that the i'th element in first group j having $m_j$ elements is mapped to $T_j((i+p_j) \bmod m_j)$, in which $T_j$ is a table, e.g., a look-up table. Here j runs over the number of groups. In an embodiment, one may take $m_j=m$ for all j. The number of groups may be equal to the number of rows, but this is not necessary. For example, one could take a default value, e.g. 0 for some parameters $p_j$. The tables $T_j$ may be rows, e.g., just add the first index of a row as above, but they may also map the first group to more complicated sets. In an embodiment, the $T_j$ maps to irregular structures. An example would be an independent set of the rook graph of the matrix, (only for square matrices). In fact, the $T_j$ may even form a Latin square design.

An alternative way to represent the selection is data is as a random seed. For example, deterministic pseudorandom number generator 160 may be seeded with the random seed, and obtaining from the output of the deterministic pseudorandom number generator an indication of the multiple values in the sequence of values and/or of the multiple entries of the shared matrix. Any of the above ways to represent selection data may be used together with a seed representation, as one can generate the selection data from the output of the random number generator. For example, in an embodiment, selection data may rotate, say, rows 1, 5, 13, 27 and 37 of the base matrix by an amount specified in the selection data. In this case, the selection data could directly contain the row or column indices and the rotation amounts, or the selection data could comprise a random seed. In the latter case, the rotation amount may be taken from the output of random number generator 160.

Note that in all these example, the selection data may be received from second node 111, in which case node 110 constructs the shared matrix from the sequence of values in accordance with the selection data. Alternatively, the node 110 may generate selection data, e.g., randomly, e.g., from a seed, and next send the selection data, either as direct data or as the random seed to the second node.

Figure 3A:
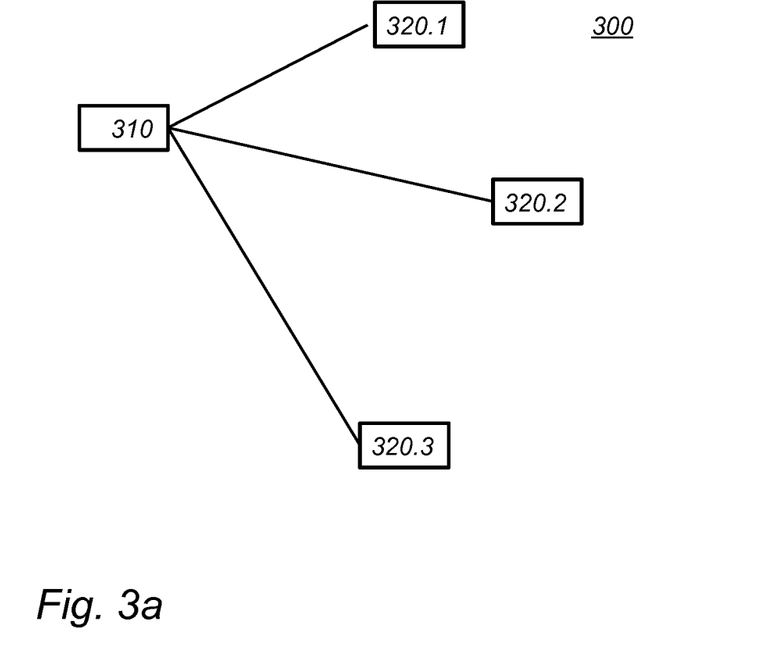

FIG. 3a schematically shows an example of an embodiment of a cryptographic system 300. System 300 comprises a server 310 and multiple clients. Shown are clients 320.1, 320.2 and 320.3. There may be many more clients. For example, server 310 may be a computer that delivers digital services over a digital network to the clients. For example, server 310 may be a web shop. The clients may use a web browser to browse a website operated by server 310 and order from the web shop. Communication between the server and the clients may be encrypted and/or authenticated. For example, the server and the clients may execute a key exchange protocol. System 300 is organized to reduce overhead associated with computing many different shared matrices for server 310.

Server 310 may be organized as first network 110 shown in FIG. 1, except that base data memory 170 is arranged as a cache memory arranged to cache a sequence of values ($A_1$, $A_2$) together with a corresponding sequence identifier which identifies said cached sequence of values. Cache memory 170 may store multiple sequences of values with an associated sequence identifier. For example, there may be two or more base matrices $A_1$, $A_2$, etc., but this is not necessary.

Base data manager 130 is arranged to obtain the sequence by receiving a sequence identifier from the second network node and to verify if a sequence of values corresponding to the received sequence identifier is cached in the cache memory and if such a sequence of values is not cached in the cache matrix, obtaining the sequence of values from the second network node. Obtaining the sequence may be done in any of the ways depicted above. In this embodiment, the second network node, e.g., a client may then be arranged to send a sequence identifier to the server corresponding to a sequence of values cached in the cache memory. In an embodiment, if a message is received from the second network node that no base matrix with that identifier is cached by the second network node, the network node may be arranged to share the base matrix (A) with the second network node, e.g., by sending the matrix, or a seed to produce the matrix.

This arrangement reduces the load on server 310 somewhat, e.g., if communication is performed twice with the same node, or if many nodes use the same sequence of values. However, in an embodiment the roles are reversed and the base data manager 130 is arranged to a select a sequence identifier for the second network node corresponding to a sequence of values cached in cache memory 170. In this way, the overhead associated with generating the base matrix, e.g., from a random seed is largely avoided at server 310.

The selection data that is subsequently exchanged between server 310 and clients and 320 may then use the sequence of values identified by the sequence identifier to construct the shared matrix.

In an embodiment, the sequence identifier comprises a further random seed. A deterministic pseudorandom number generator is seeded with the further random seed. The sequence of values is obtained from the output of the seeded deterministic pseudorandom number generator. By including the further random seed in the sequence identifier, a party that does not have the sequence cached can compute when needed.

Figure 3B:
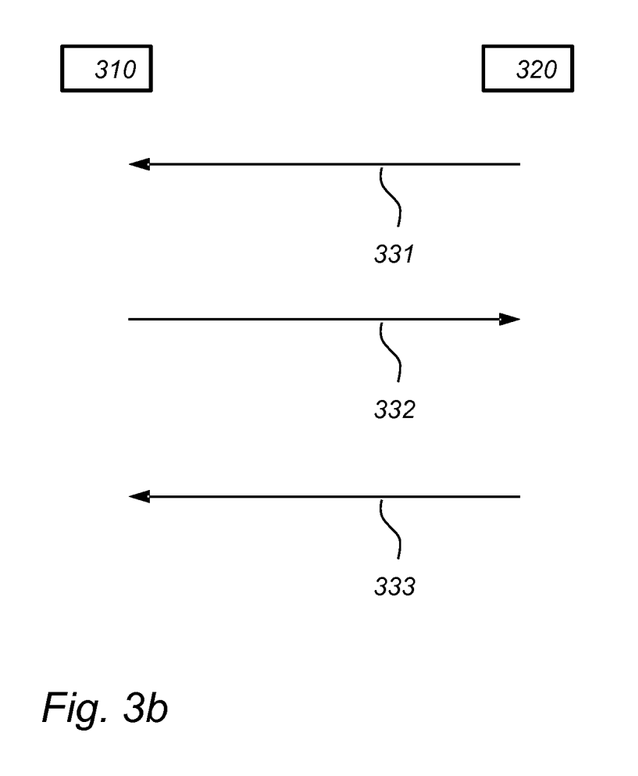

Some of these options are illustrated in FIG. 3b which schematically shows an example of an embodiment of a detail of a cryptographic protocol executed between a server 310 and a client 320, e.g., one of the clients shown in FIG. 3a.

A first message 331 sent from client 320 to server 310 comprises a message request. It may comprise additional information such as an identifier for client 320. In response, server 310 sends a second message 332 to client 320. Second message 332 comprises a sequence identifier, e.g., comprising a further random seed. Server 310 has cached the corresponding sequence of values, e.g., after having computed it once from the further random seed. The sequence of values may be in the form of a base matrix. Message 332 may also comprise selection data, generated by server 310. The selection data in message 332 may be in the form of a random seed, or not. Message 332 may also contain protocol information generated by server 310, which is possible since server 310 at this point has access to the shared matrix. For example, in a key exchange protocol as described above, message 332 could comprise a public key generated for this key exchange execution. After receiving message 332, client 320 may retrieve the sequence of values from its cache memory, or, if the sequence of values is not present in the cache memory, generate the sequence of values from the further random seed in the sequence identifier. Furthermore, client 320 may construct the shared matrix from the sequence of values and the selection data. Using the constructed shared matrix, client 320 may generate further values in the protocol, and return them with message 333. For example, if this is a key exchange protocol, then message 333 may contain a public key generated by client 320 from the shared matrix and a private key of client 320. Message 320 may also contain encrypted information, encrypted with a key derived from its own private key and the public key obtained in message 332. For example, the encrypted data may contain, say, a credit card number of a user of client 320. Server 310 when it receives the message 333 may use the public key and its own private key matrix to obtain the encryption key and decrypt the encrypted data, e.g., to obtain the credit card number.

Many variants are possible on the above protocol, for example, in a first variation, the selection data is not selected, or not only selected, by the server 310 and sent in message 320 but selected, or also selected, by client 320 and sent in message 333 to server 310. In the latter case, it is advantageous that the selection data in message 3333 directly determines a mapping between the sequence of values identified by the sequence identifier and the shared matrix, without using a random seed to generate it. For example, each node may specify a permutation of a base matrix. A particular one, say the initiating node of the protocol, may apply his permutation first followed by the permutation of the responding node.

In the various embodiments, the communication interface may be selected from various alternatives. For example, input interface may be a network interface to a local or wide area network, e.g., the Internet, a storage interface to an internal or external data storage, etc.

Base data memory 170 may be implemented as an electronic memory, say a flash memory, or magnetic memory, say hard disk or the like. Base data memory 170 may comprise multiple discrete memories together making up base data memory 170. Base data memory 170 may also be a temporary memory, say a RAM. In the case of a temporary Base data memory 170, Base data memory 170 contains some means to obtain parameters before use, say by obtaining them over an optional network connection (not shown).

Typically, the device 110 and the 111 each comprise a microprocessor (not separately shown) which executes appropriate software stored at the device 110 and the 111; for example, that software may have been downloaded and/or stored in a corresponding memory, e.g., a volatile memory such as RAM or a non-volatile memory such as Flash (not separately shown). The devices 310 and 320.1-3 may also be equipped with microprocessors and memories (not separately shown). Alternatively, the devices 110 and the 111 may, in whole or in part, be implemented in programmable logic, e.g., as field-programmable gate array (FPGA). Devices 110 and the 111 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, first network node 110 comprises a communication interface circuit, a base data manager circuit, a matrix generation unit circuit, a cryptographic unit circuit, a matrix multiplication unit circuit, a pseudorandom number generator circuit, etc. The device 100 may comprise additional circuits, e.g., a cache circuit, etc. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Below a number of additional embodiments are described that reduce bandwidth and computation requirements in key-exchange schemes and the like, that rely on large matrices. This is especially helpful for servers that have to deal with many connections as it may be used to reduce the computational effort at the server-side if that server will have to handle many connections. In an embodiment, it is proposed to:

Have a public static sequence of values P of length $L \geq mn$.
Exchange a seed between initiator and server to obtain a permutation r of $\{1, \ldots, L\}$. r is then used to obtain the public m×n matrix A used in the key exchange. The top row of A equals $(P_{r_1}, P_{r_2}, \ldots, P_{r_n})$, its second row equals $P_{r_{n+1}}, P_{r_{n+2}}, \ldots, P_{r_{2n}}, \ldots$, and its bottom row equals $P_{r_{(m-1)n+1}}, P_{r_{(m-1)n+2}}, \ldots, P_{r_{mn}}$.

The performance is better since the elements in r are smaller than the elements in A and therefore can be computed faster and more efficiently. The sequence of values may be obtained in a number of ways. For example:

Embodiment 0: it may be a static parameter.
Embodiment 1: an initiator publishes seed value per day for all communications.
Embodiment 2: an initiator publishes matrix A per day for all communications.
Embodiment 3: an initiator publishes seed_long for a long period of time out of which seeds for shorter periods of time can be computed such as seed=PRF(seed_long-|time).

In some settings, it makes more sense that the responder publishes the seed since it can often happen that the responder is a server handling many connections. This seed can also be computed by a trusted third party independent of server and client according to any of the above embodiments. The initiator and responder may be taken as the first and second network node or vice versa. For example, the initiator may be network node that initiates the cryptographic protocol. However, other criteria may be used, for example, the initiator may be defined as the network node that uses key reconciliation data, while the responder generates key reconciliation data (key reconciliation data is data used to ensure that both parties arrive at the same share key).

Embodiment 4 describes a further embodiment that provides a good trade-off between memory and CPU.

Initiator or responder or a third party publishes a first seed used to compute a m×n matrix $A_0$. Initiator computes a second seed' and applies a pseudorandom function (PRF) to obtain a random permutation r of numbers $[0, \ldots, mn-1]$.
Initiator sends seed' to responder.
Responder obtains r and rearranges the entries of $A_0$ according to the permutation to obtain A.
Once initiator and responder have obtained A, the rest of the protocol follows as above.
Further extensions of embodiment 4:
Construct a public sequence P, e.g., the sequence of values or the base matrix, of length $L \geq mn$. Exchange a seed between initiator and server to obtain a permutation r of $\{1, \ldots, L\}$ r is then used to obtain the public m×n matrix A used in the key exchange. The top row of A equals $(P_{r_1}, P_{r_2}, \ldots, P_{r_n})$, its second row equals $P_{r_{n+1}}, P_{r_{n+2}}, \ldots, P_{r_{2n}}, \ldots$, and its bottom row equals $P_{r_{(m-1)n+1}}, P_{r_{(m-1)n+2}}, \ldots, P_{r_{mn}}$.
It is not strictly required that r is a permutation. It is sufficient that for $1 \leq i \leq mn$, it holds that $1 \leq r_i \leq L$.
In an embodiment, a PRF is used to generate a sequence of bits, which then is transformed into a permutation. For example, we may generate A bits, where $2^A \geq L!$ We may interpret the A bits as an integer number and use the Lehmer code to determine the corresponding permutation. The Lehmer code is a mathematical algorithm to encode a permutation.
For large L, this may be cumbersome and a smaller set of permutations may be preferred from an implementation perspective. For example, take L=mn. The bit-sequence is partitioned into m blocks each of length B, and block i is considered as a label for a permutation for the entries (i−1)n+1, (i−1)n+2, ... in of P. For example, if $2^B \geq n$, the permutation corresponding to a block is a cyclic shift over i positions for some $i \in \{0, 1, \ldots, n-1\}$. If $2^B \geq n!$, any permutation on n positions can be labelled with a B-bits label. The correspondence between labels and permutations can either be stored explicitly (for sufficiently small n), or can be computed using the Lehmer code.

In an embodiment, the permutation is such that it leaves many positions in its place. This reduces the amount of required re-arrangements, and allows that a relatively small number of bits from a PRF need to be generated. As a specific example, take L=mn. The set of numbers {1, 2, . . . , mn} is partitioned in m subsets of size n, for example, sets of the form {(i−1)n, (i−1)n+1, . . . , in}. The first $s\lceil \log_2 m \rceil$ bits of the PRF are used to indicate s subsets in which a permutation will take place. The next $s\lceil \log_2 n \rceil$ bits are used to select over how many positions the entries in each of the s selected subsets will be shifted.

In an embodiment, the permutation is a sequence of s swaps (aka transpositions). The bit sequence is considered as a sequence $(x_0, x_1, \ldots, x_{2s-1})$ of integers of bit length $\log_2$ (nm), and the permutation consists of the sequence of swaps (transpositions) of the entries of P in positions $x_0, x_1$, followed by swapping the entries of P in positions $x_2, x_3, \ldots$, followed by swapping the entries of P in positions $x_{2s-2}, x_{2s-1}$.

There are various ways in which the public sequence P can be obtained. For example, the public sequence may, in one embodiment, be specified in an industry standard. In another embodiment, it is generated by a server S. A client C wishing to communicate with S receives P, or parameters, e.g. a seed, and a method to compute P from S. In this way, the server uses P for multiple sessions and clients, and need not re-compute it. In yet another embodiment P is generated and distributed by a trusted third party (TTP). A server may store P and use it for communication with multiple clients. The sequence P may only be valid during a time-period indicated by the TTP. In yet another embodiment, there are multiple TTPs each generated their own public sequence $P_i$. A server S stores all such matrices. A client C selects sequences from TTP that it actually trusts, combines them in some pre-specified way, and applies a permutation on this combination. It sends to S the indices of the selected TTPs, and a seed so that S can retrieve said permutation. By combining matrices and permuting entries, S can find the matrix actually used by C.

The pseudo random function (PRF) can be defined as, e.g.:

PRF1: A recursive hash function whose output is divided into groups of $\lceil \log n \rceil$ bits. Each group will then be used to pick up a different element.

PRF2: PRF1 will have collisions since $\lceil \log n \rceil$ will be a relatively small number. An alternative is to keep track of the used numbers and discard those that already appeared.

PRF3: another alternative consists in $g^k$ (mod p) where $p > \lceil \log n \rceil$ where p is a prime number and g is a generator. k would be the seed and this PRF is iterated by increasing k (mod n).

The application of above embodiments, in particular Embodiment 4, to other schemes may be as follows. For example, for the cryptographic lattice based protocol described in "Post-quantum key exchange—a new hope", by Erdem Alkim et al. One could modify their scheme as follows. Given a vector a and secrets s and e, then b is computed as $b=(\alpha s+e) \text{modulo}(x^n+1)$. Generation of a in this case is cheaper since it only contains n elements, but it might still be expensive for the server if it has to compute many vectors out of an initial seed. An alternative is to have a static p (set of elements) and compute the random permutation vector r. In this way, the computation would be: $b=(\alpha[r]s+e)\text{mod}(x^n+1)$ where $\alpha[r]$ represents the permuted version of $\alpha$ according to r. Since r has smaller elements than $\alpha$, it can be computed more cheaply than $\alpha$.

In lattice-based public-key encryption schemes the public-key, e.g., LWE, the public key is given by a pair (b, A). Matrix A can take a considerable space for storage or alternatively, it may need to be generated dynamically. An alternative is to have a set of public values P. And have as public-key, (b, seed') so that seed' is used to obtain the permutation vector r that determines how the elements in P are mapped to matrix A used to obtain b as b=As+e. The advantage is that the storage needs at a server will be much lower and the computational needs also much lower.

Figure 4:
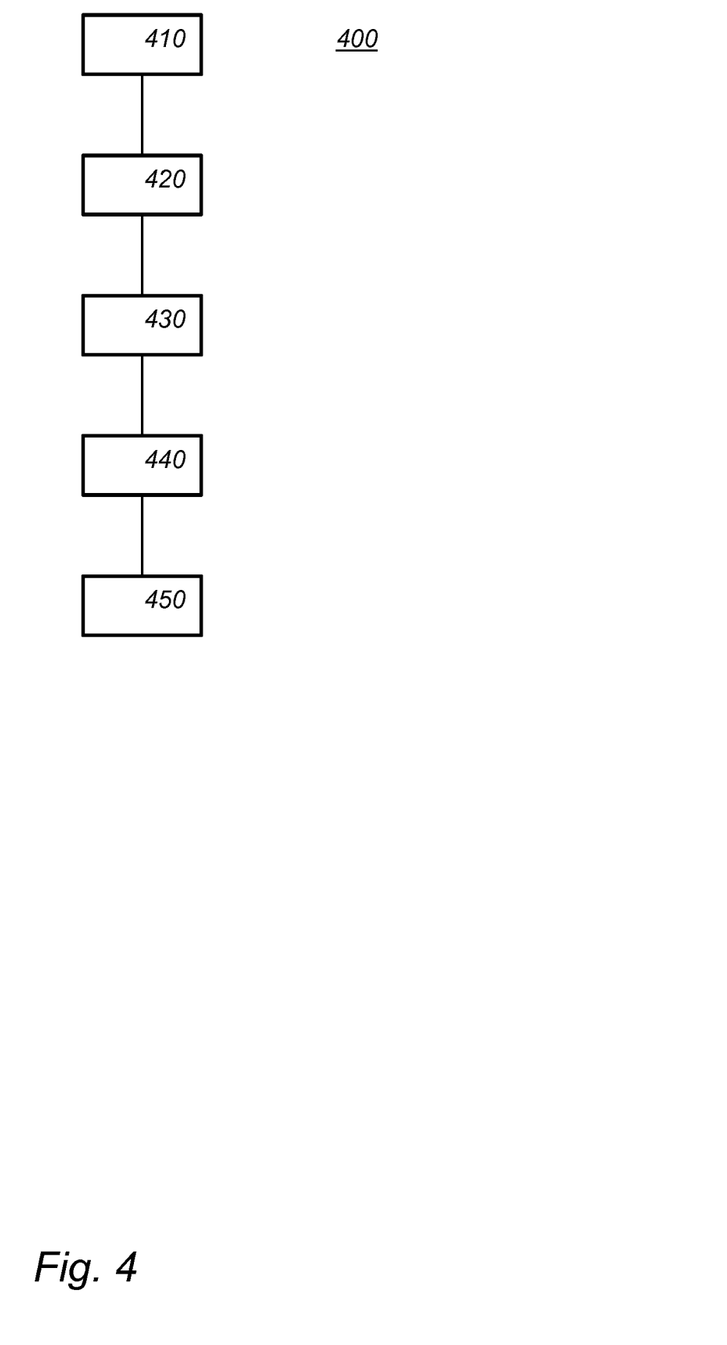

FIG. 4 schematically shows an example of an embodiment of a method for sharing a matrix 400. Method 400 is an electronic method for a first electronic network node configured for a cryptographic protocol based on a shared matrix, e.g., such as network node 110. The shared matrix having multiple entries each entry having a value. Method 400 comprises establishing (410) digital communication between the first network node and a second network node (111), obtaining (420) a sequence of values for the entries of the shared matrix, the sequence of values being shared with the second network node, receiving (430) selection data from the second network node, or determining selection data and sending the selection data to the second network node, the selection data indicating multiple positions in the sequence of values and assigning to multiple entries of the shared matrix a value of the sequence of values indicated by the selection data, constructing (440) the shared matrix (A) in accordance with the selection data, setting said multiple entries of the shared matrix to the multiple values assigned by the selection data, and applying (450) the shared matrix in the cryptographic protocol.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 5A:
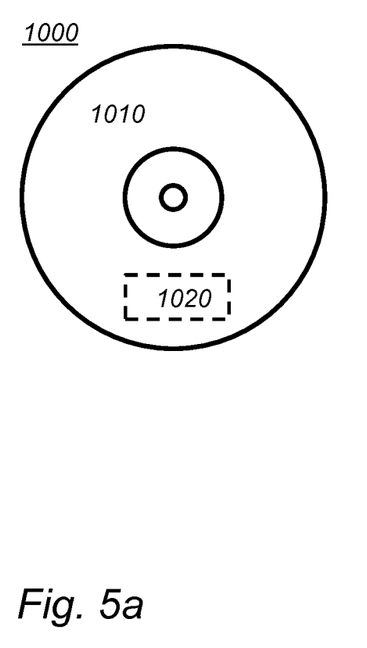

FIG. 5a shows a computer readable medium 1000 having a writable part 1010 comprising a computer program 1020, the computer program 1020 comprising instructions for causing a processor system to perform a method of sharing a matrix, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of sharing a matrix.

Figure 5B:
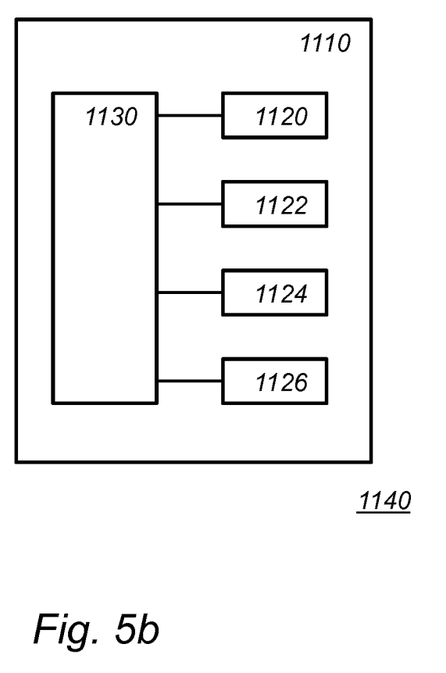

FIG. 5b shows in a schematic representation of a processor system 1140 according to an embodiment. The processor system comprises one or more integrated circuits 1110. The architecture of the one or more integrated circuits 1110 is schematically shown in FIG. 5b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the first network node may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

LIST OF REFERENCE NUMERALS IN FIGS. 1-3b 100 a cryptographic system
110 a first electronic network node
111 a second electronic network node
120 a communication interface
130 a base data manager
140 a matrix generation unit
150 a cryptographic unit
152 a matrix multiplication unit
160 a pseudorandom number generator
170 a base data memory
210 a sequence of values
221, 222 a value
230 a shared matrix
231, 232 an entry in the shared matrix
233 selection data
241, 242 a first group
251, 252 a second group
260 a base matrix
261-263 a row
300 a cryptographic system
310 a server
320, a client
320.1-320.3
331-333 a transmission

The invention claimed is:

1. A first electronic network node configured for a cryptographic protocol based on a shared matrix, the shared matrix having multiple entries each entry having a value, the first network node comprising
 a communication interface,
  wherein the communication interface is arranged for digital communication with a second network node,
 a cache memory,
  wherein the cache memory is arranged to cache a sequence of values,
  wherein the multiple entries of the shared matrix are assigned values of the sequence of values as cached in the cache memory,
 a processor circuit configured to:
  obtain a sequence of values from which values for the shared matrix are selected,
   wherein the sequence of values are shared with the second network node,
  cache the sequence of values for use with multiple connections, receive selection data from the second network node, or determining selection data and sending the selection data to the second network node,
    wherein the selection data indicates multiple positions in the sequence of values,
assign to multiple entries of the shared matrix a value of the cached sequence of values indicated by the selection data,
construct the shared matrix in accordance with the selection data and the sequence of values,
    wherein constructing shared matrix comprises setting the multiple entries of the shared matrix to the multiple values assigned by the selection data, and
apply the shared matrix in the cryptographic protocol comprising calculating a matrix product between the shared matrix and the private vector.

2. The first network node of claim 1,
wherein the processor circuit is further configured to select a predetermined first group of values in the sequence of values for a corresponding predetermined second group of entries of the shared matrix,
wherein the selection data indicates multiple positions in the first group for the entries in the second group,
wherein each entry in the second group is assigned a value from the first group,
wherein the second group has fewer entries than the shared matrix.

3. The first network node of claim 2, wherein a part of the selection data that indicates the multiple values in the first group for the entries in the second group has a bit size smaller than 1/100 of the total bit size of the values in the second group.

4. The first network node of claim 2,
wherein the sequence of values forms a base matrix,
wherein the selection data indicates a cyclic permutation of at least one row and/or column of the base matrix,
wherein the cyclic permutation indicates a number of entries over which the at least one row and/or column is rotated.

5. The first network node of claim 1,
wherein the processor circuit is further arranged to:
    compute from a parameter in the selection data at least one entry in the sequence of values and at least one entry in the shared matrix,
        wherein the computation is linear in the parameter, and
    assign the value of the computed entry in the sequence of values to the entry in the shared matrix.

6. The first network node of claim 1,
wherein the selection data comprises a random seed,
wherein the processor circuit is further configured to:
    seed a deterministic pseudorandom number generator with the random seed, and
    obtain an output of the deterministic pseudorandom number generator,
        wherein the output provides an indication of the multiple values in the sequence of values and/or of the multiple entries of the shared matrix.

7. The first network node of claim 1,
wherein the selection data comprises a permutation,
wherein the processor circuit is further arranged to:
    permute the sequence of values according to the permutation, and
    assign the permuted sequence of values to entries of the shared matrix according to a default assignment.

8. The first network node of claim 1, wherein the processor circuit is further configured to compute a matrix product between the shared matrix and a private vector or matrix of the first network node as part of the cryptographic protocol.

9. The first network node of claim 8, wherein the first and second network node are configured for a key exchange protocol, and the processor circuit is further configured to
    generate a private key matrix,
    generate a public key matrix,
    wherein generating the public key matrix comprises:
        computing a matrix product between the shared matrix and the private key matrix to obtain a matrix product
        sending the public key matrix of the first network node to the second network node,
        receiving a public key matrix of the second network node, and
        computing a raw key as a matrix product between the received public key of the second node and the private key matrix of the first network node,
    wherein the first network node is further configured to compute a shared key from at least the raw key.

10. The first network node of claim 8,
wherein the first and second network node are configured for a public-key encryption protocol,
wherein the processor circuit is further configured to:
    obtain a public key of a second network node,
        wherein the public key comprises the selection data and a further public key matrix,
        wherein the further public key matrix has been previously obtained from the shared matrix and a private key matrix,
    choose a random vector,
    compute a first matrix product between the random vector and the shared matrix,
    compute a second matrix product between the random vector and the further public key matrix,
    compute an encrypted message from a plain message by adding a blinding vector computed from one of the first and second matrix products,
    wherein the encrypted message further includes decryption information computed from an other one of the first and second matrix products.

11. The first network node of claim 1,
wherein the cache memory is arranged to cache a sequence of values together with a corresponding sequence identifier,
wherein the sequence identify identifies the cached sequence of values,
wherein the processor circuit is configured to:
    receive a sequence identifier from the second network node, and
    verify if a sequence of values corresponding to the received sequence identifier is cached in the cache memory,
        wherein if such a sequence of values is not cached in the cache matrix, the processor circuit is configured to obtain the sequence of values from the second network node, and
    use the sequence of values identified by the sequence identifier to construct the shared matrix.

12. The first network node of claim 11,
wherein the sequence identifier comprises a further random seed,
wherein the processor circuit is further configured to:
    obtain the sequence of values by seeding a deterministic pseudorandom number generator with the further random seed, and derive the sequence of values from an output of the seeded deterministic pseudorandom number generator.

13. The first network node of claim 1, wherein the sequence of values is obtained from a trusted third party.

14. The first network node of claim 1, wherein the number of different shared matrices obtainable from a single sequence of values using different selection data is at least $2^{64}$.

15. The first network node of claim 1,
wherein the first network node is arranged to accept encrypted network connections from multiple second network nodes,
wherein the first network node is arranged to accept a connection request from a second node by sending a response message,
wherein the response message comprises a random seed,
wherein the random seed indicates a sequence of values stored in a cache memory of the first network node,
wherein the second network node sends the selection data to the first network node.

16. An electronic network system comprising:
the first network node of claim 1, and
the second network node,
wherein the second network node is configured for the cryptographic protocol based on the shared matrix and a private vector, the second network node comprising
a communication interface arranged for digital communication with the first network node,
a cache memory arranged to cache the sequence of values, wherein the multiple entries of the shared matrix are assigned a value of the sequence of values as cached in the cache memory,
a processor circuit configured to:
  obtain the same sequence of values as the first node, wherein values for the shared matrix is selected from the sequence, and
  cache the sequence of values for use with multiple connections,
  determine selection data,
  send the selection data to the first network node, or receive selection data from the first network node, wherein the selection data indicates multiple positions in the sequence of values and
  assign to multiple entries of the shared matrix a value of the sequence of values indicated by the selection data,
  construct the same shared matrix as the first network node in accordance with the selection data and the sequence of values,
  set the multiple entries of the shared matrix to the multiple values assigned by the selection data,
  apply the shared matrix in the cryptographic protocol,
    wherein the cryptographic protocol comprises calculating a matrix product between the shared matrix and the private vector.

17. An electronic method for a first electronic network node, wherein the first electronic network node is configured for a cryptographic protocol based on a shared matrix and a private vector, wherein the shared matrix comprises multiple entries, where each entry comprises a value, the method comprising:
establishing digital communication between the first network node and a second network node,
obtaining a sequence of values from which values for the shared matrix are selected,
  wherein the sequence of values are shared with the second network node,
caching the sequence of values for use with multiple connections,
receiving selection data from the second network node, or determining selection data and sending the selection data to the second network node,
  wherein the selection data indicates multiple positions in the sequence of values,
assigning to multiple entries of the shared matrix a value of the sequence of values indicated by the selection data,
constructing the shared matrix in accordance with the selection data,
  wherein constructing the shared matrix comprises setting the multiple entries of the shared matrix to the multiple values assigned by the selection data, and
applying the shared matrix in the cryptographic protocol,
  wherein the cryptographic protocol comprises calculating a matrix product between the shared matrix and the private vector.

18. A non-transitory computer readable medium comprising data representing instructions to cause a processor system to perform the method according to claim 17.

* * * * *